United States Patent
Alon et al.

(10) Patent No.: US 7,577,113 B2
(45) Date of Patent: Aug. 18, 2009

(54) DEVICE, SYSTEM AND METHOD FOR COORDINATING POWER SAVING WITH ACCESS CATEGORIES

(75) Inventors: Ayelet Alon, Haifa (IL); Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 627 days.

(21) Appl. No.: 11/094,289

(22) Filed: Mar. 31, 2005

(65) Prior Publication Data

US 2006/0229023 A1 Oct. 12, 2006

(51) Int. Cl.
*G08C 17/00* (2006.01)

(52) U.S. Cl. ............... 370/311; 370/318; 370/338; 455/69; 455/574; 455/343.2; 455/512

(58) Field of Classification Search ... 455/343.1–343.6, 455/522, 69, 572–574, 512, 41.2; 370/311, 370/318, 338, 328
See application file for complete search history.

(56) References Cited

U.S. PATENT DOCUMENTS

| | | | | |
|---|---|---|---|---|
| 5,949,812 | A * | 9/1999 | Turney et al. | 375/130 |
| 6,704,561 | B2 * | 3/2004 | Kuroiwa | 455/343.1 |
| 6,804,542 | B1 * | 10/2004 | Haartsen | 455/574 |
| 6,917,598 | B1 * | 7/2005 | Emeott et al. | 370/311 |
| 6,952,785 | B1 * | 10/2005 | Diab et al. | 713/300 |
| 6,973,052 | B2 * | 12/2005 | Wang et al. | 370/278 |
| 7,281,144 | B2 * | 10/2007 | Banginwar et al. | 713/320 |
| 7,433,670 | B2 * | 10/2008 | Benveniste | 455/343.2 |
| 7,477,616 | B2 * | 1/2009 | Wang et al. | 370/311 |
| 7,505,795 | B1 * | 3/2009 | Lim et al. | 455/574 |
| 2005/0009578 | A1 * | 1/2005 | Liu | 455/574 |
| 2005/0018624 | A1 * | 1/2005 | Meier et al. | 370/316 |
| 2005/0138451 | A1 * | 6/2005 | Simpson et al. | 713/320 |
| 2005/0152324 | A1 * | 7/2005 | Benveniste | 370/338 |
| 2006/0229023 | A1 * | 10/2006 | Alon et al. | 455/69 |

OTHER PUBLICATIONS

Daqing Gu, Jinyun Zhang "QoS Enhancement in IEEE802.11 Wireless Local Area Networks" MERL—A Mitsubishi Electric Research Laboratory. Jul. 2003.*

Gibraltar: Application and Network Aware Adaptive Power Management for IEEE 802.11 Rajesh Banginwar Eugene Gorbatov Corporate Technology Group. Intel Corporation.

Hybrid Change Makes WLAN QoS Come to Life CommsDesign Andrew Shepard. Bermai Apr. 28, 2004.

Daqing Gu, Jinyun Zhang "QoS Enhancement in IEEE802.11 Wireless Local Area Networks" MERL—A Mitsubishi Electric Research Laboratory, Jul. 2003.

* cited by examiner

*Primary Examiner*—Sharad Rampuria
(74) *Attorney, Agent, or Firm*—Shiloh Buchek PLLC

(57) ABSTRACT

A method, device and system to set a power saving mode of for example a station to correspond to a power saving parameter that may be associated with a access category of a wireless packet in for example a uplink and a downlink of such station.

19 Claims, 3 Drawing Sheets

| ACCESS CATEGORY | | Tx TIMEOUT | Rx TIMEOUT | SNOOZING INTERVAL |
|---|---|---|---|---|
| AC-BK (BACKGROUND) | | NO CHANGE: SET ACCORDING TO A PRE-DEFINED BALANCE BETWEEN BATTERY LIFE AND PERFORMANCE | | |
| AC-BE (BEST EFFORT) | | | | |
| AC-VI (VIDEO) | Tx STREAM | 25 MSEC | 25 MSEC | 1 BEACON INTERVAL |
| | Rx STREAM | 25 MSEC | 25 MSEC | |
| | BIDIRECTIONAL STREAM | 25 MSEC | 25 MSEC | |
| AC-VO (VOICE) | Tx STREAM | 50 MSEC | 25 MSEC | 1 BEACON INTERVAL |
| | Rx STREAM | 25 MSEC | 50 MSEC | |
| | BIDIRECTIONAL STREAM | 50 MSEC | 50 MSEC | |

*FIG.2*

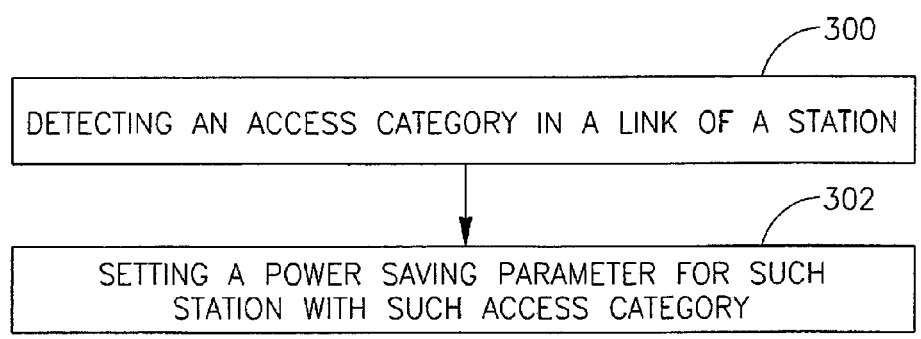

*FIG.3*

DEVICE, SYSTEM AND METHOD FOR COORDINATING POWER SAVING WITH ACCESS CATEGORIES

BACKGROUND OF THE INVENTION

A power saving mode of a wireless subsystem such as for example a station with wireless transmission capabilities may reduce the power consumption of the station between wireless transmissions to and from the station. A quality of service (QoS) capability in a network, such as for example a wireless local area network (WLAN) may assign access categories (AC), to various streams of packets. The assigned AC of a stream of packets may depend on the packets' priority assigned by for example an application, and may be referred to as a User Priority (UP). An AC may include for example a common set of enhanced distributed channel access (EDCA) parameters that may be used by a QoS function to contend for a channel in order to transmit packets with certain properties. In certain QoS functions, the hierarchy of AC's may include for example (listed in this example in ascending order of priority) background (BK), best efforts (BE), video (VI) and voice (VO). Other ACs may be used. Such AC's may be associated with particular power savings parameters. One such power saving parameter may be for example, a timeout interval, which is the required interval after a particular transmission (Tx) or receipt (Rx) of a packet that a station must stay awake before it may enter power save mode. Another power saving parameter may be a snooze interval, which is an interval during which a station may remain in a power save mode. Application of an incorrect power saving parameter to an AC may degrade an application performance or system throughput, and may increase overall power consumption.

BRIEF DESCRIPTION OF THE FIGURES

Embodiments of the invention will be understood and appreciated more fully from the following description taken in conjunction with the appended drawings in which:

FIG. 2 is table of timeout intervals and snooze intervals for AC's in accordance with an exemplary embodiment of the invention;

FIG. 3 is a flow diagram depicting a method of coordinating a power saving parameter for a station with an AC in accordance with an embodiment of the invention.

DETAILED DESCRIPTION OF THE INVENTION

In the following description, various embodiments of the invention will be described. For purposes of explanation, specific examples are set forth in order to provide a thorough understanding of at least one embodiment of the invention. However, it will also be apparent to one skilled; in the art that other embodiments of the invention are not limited to the examples described herein. Furthermore, well-known features may be omitted or simplified in order not to obscure embodiments of the invention described herein Unless specifically stated otherwise, as apparent from the following discussions, it is appreciated that throughout the specification, discussions utilizing terms such as "selecting," "processing," "computing," "calculating," "determining," or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. For example, while the term WLAN as used in this application may refer to a wireless link between a computer, an access point and a server or LAN, such term may also refer for example, to a wireless connection between any digital device such as, for example, a cellular phone, computer peripheral or PDA on the one hand, and a transceiver which may be linked to other electronic devices on the other hand, such that the linked devices constitute a network such as a mircronet, scatternet or piconet, each of which may in certain embodiments be considered a WLAN as is used in this application. In other embodiments, a WLAN may include, for example, a local satellite or cable TV or data system that provides residents of a particular building or residential area with wireless access to TV, radio or other broadcasts, based on requests for access made by a resident's TV or radio.

Figure 1:
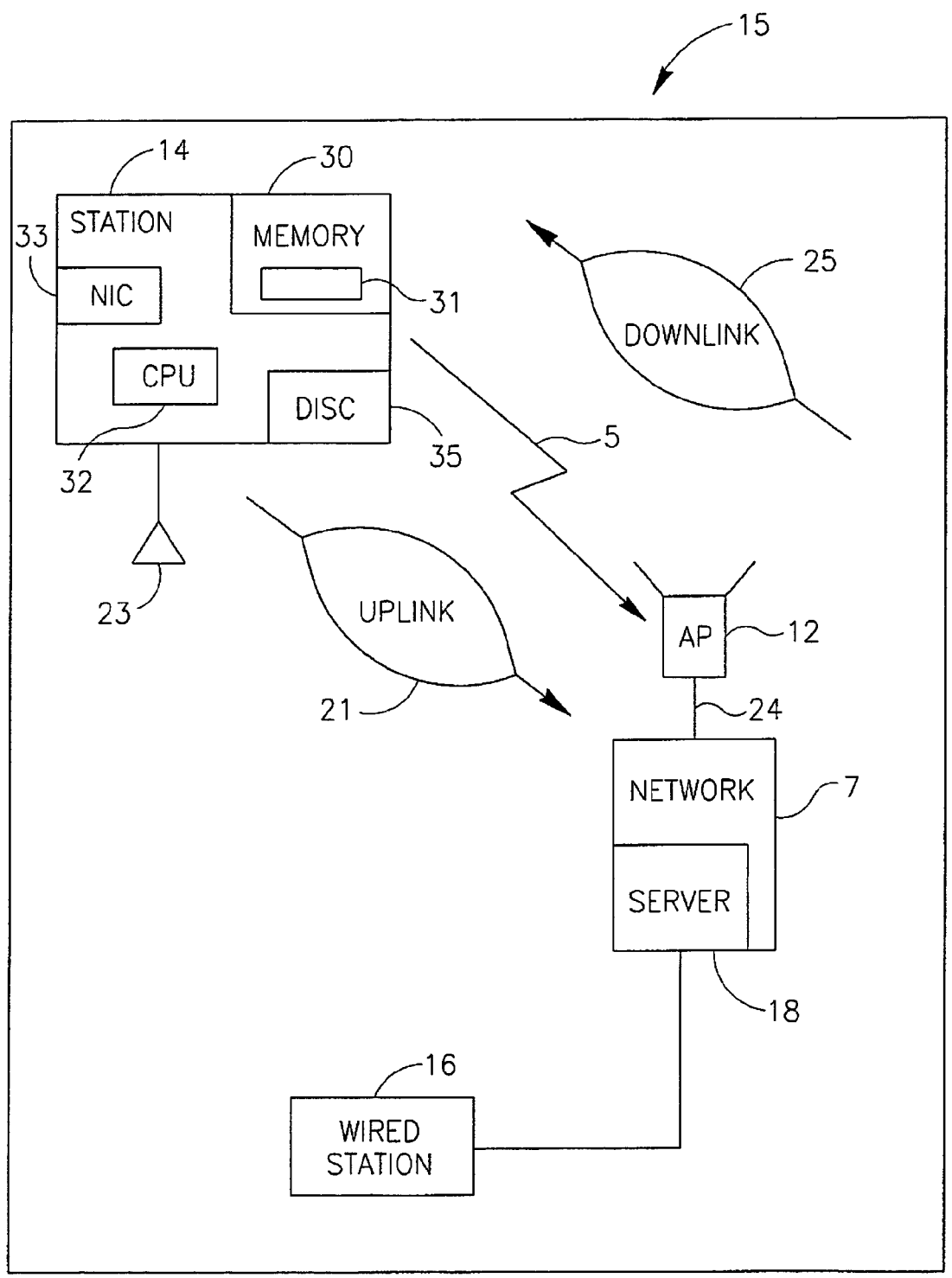
FIG. 1 is a schematic diagram of components of a WLAN including a station with wireless capabilities, in accordance with an exemplary embodiment of the invention.

Reference is made to FIG. 1, a schematic diagram of components of a station and a network in accordance with an exemplary embodiment of the invention. WLAN 15 may for example include one or more peers, such as for example wireless mobile units such as stations 14 and one or more providers of a basic service set (BSS) such as for example an access point 12. Access point 12 may for example, facilitate an association between a wireless device such as for example station 14 and a network such as WLAN 15. In some embodiments, a station 14 may communicate with another station 14. WLAN 15 may for example be a wireless network or a network that may include wireless components. For example, in some embodiments, WLAN 15 may be or be part of a local area network (LAN) with wireless links. In some embodiments, WLAN 15 may be part of for example a wide area network (WAN). A BSS provider such as for example an access point 12 may in some embodiments associate wireless devices such as for example stations 14 with other equipment such as for example personal computers, workstations, printers, etc. Access point 12 may be linked to a network 7 by wireless communication or by wires 24. Network traffic 5 between a wireless device such as for example a station 14 and a provider of a BSS such as access point 12 may for example be radio waves carrying digital data or wireless signals.

Traffic 5 may assume various forms such as for example infrared or other electromagnetic waves. In some embodiments, traffic 5 from a station 14 to for example an access point 12 may be known as flows or streams of Tx packets or an uplink 21. In some embodiments, traffic 5 that is received by a station 14 may be known as a downlink 25 or as flows or streams of Rx packets. Other designations may be used. Uplink 21 may include stream of wireless signals or packets that are sent from a station 14 to an access point 12 as well as wireless signals that are received by a station 14. A downlink 25 may include streams of wireless signals or packets that are received by station 14 from access point 12.

In some embodiments, the various devices communicating on a network such as for example WLAN 15 need not be stations 14 or access points 12 or the other specific devices mentioned herein but may rather be peers or other wireless devices receiving and transmitting wirelessly. In some embodiments, an access point 12, a station 14 or another component of or included in WLAN 15 may include an antenna such as for example a dipole antenna 23, and may include a wireless interface device such as a network interface card (NIC) 33. Other network devices such as for example wireless devices with different configurations, protocols or structures may be included in embodiments of the invention disclosed herein.

In some embodiments, traffic 5 may include for example packets or other collections of signals and/or data, such as for example media access control service data units (MSDU's) that may make up a transmission of wireless signals from for example an access point 12 to a station 14 or from a station 14 to an access point 12.

Access point 12 may be a unit or system that wirelessly receives and transmits signals, including for example, signals received wirelessly, to and from clients or stations 14, and that may serve as a relay or interface between one or more clients or stations 14 that may be communicating wirelessly and other components of the network 7, such as for example a wired station 16, a LAN server 18 or other network components. Access point 12 may include, for example, an Ethernet port, a radio communication unit and a modem. Other or additional components may also be used in access points 12.

Station 14 may include a memory 30 or data storage component, that may store for example data relating to wireless communication standards such as for example IEEE-Std 802.11, 1999 Ed. (ISO/IEC 8802-11:1999) and more particularly the IEEE 802.11e/D13.0 January 2005 (Draft Amendmnent to IEEE Std. 802.11, 1999). Other communication standards and protocols may be used in embodiments of the invention. Memory 30 may also store data relating to QoS capabilities applicable to for example WLAN 15, and to various AC's, as well as the power savings parameters 31 that may be applicable to such respective AC's.

Station 14 may include one or more processors 32 such as for example a central processor, a processor in a wireless modem or other processors. In some embodiments, processor 32, alone or in conjunction with one or more other processors, may be suitable for determining the AC of a transmitted or received signal in a uplink 21 or downlink 25. In some embodiments, a processor such as processor 32 may be suitable for selecting a power saving parameter 31 that is applicable to the AC of a particular packet or wireless signal in a stream of trffic 5. In some embodiments, power saving parameters 31 associated with a particular AC in a link or stream of traffic 5 may be available from other sources.

In operation, processor 32 may evaluate the AC's of for example MSDUs or packets that a station 14 may receive or transmit in a given or relevant interval or portion of an uplink 21 or downlink 25. The evaluation may include a selection or determination of for example the highest AC included among the streams of packets received or transmitted during such interval. Such evaluation may be performed on for example a continuous, intermittent or periodic basis Processor 32 may refer to for example memory 30 for power savings parameters 31 that may be associated with for example the highest AC, or for example an average or weighted average of the AC's that was detected or selected in an uplink 21 or downlink 25 during the relevant interval, and may set or coordinate the power saving parameter 31 of the station 14 to the power saving parameters 31 associated with such for example highest AC detected in the relevant interval. For example, if in a relevant interval, a link that includes one or more streams of packets fitting a VO AC is detected, the power saving or management mode (such as for example the length of timeout interval and length of snooze interval) of a station 14 may be set to the power savings parameters that are applicable to or associated with the VO AC. Other parameters may be part of a power management embodiment.

In some embodiments, instructions may be recorded or stored in a storage medium such as for example an electronic or magnetic storage medium or disc 35, that may when executed approximate a method in accordance with an embodiment of the invention.

Reference is made to FIG. 2, a table of power saving parameters 31 such as timeout intervals and snooze intervals for certain AC's in accordance with an exemplary embodiment of the invention. Other parameters, and other types of parameters, may be used; other aspects of the operation of a device may be altered for power management or power saving purposes. For example, as is shown on such table, the minimum timeout interval corresponding to a VI AC for an uplink or for a downlink or for a bi-directional link may be 25 milliseconds ("msec"). A maximum snooze interval corresponding to a VI AC may be for example one beacon period, which in some embodiments may for example correspond to the length of time between transmissions of a beacon by for example an access point 12 to a station 14. In some embodiments a beacon period may be for example 100 msec. Other durations of beacon periods are possible.

In another example, a station 14 must stay awake after a last transmitted VO packet for the timeout interval corresponding to a VO AC which may be for example 50 msec for an uplink 21. In the case of a packet in VO AC in a downlink 25, the timeout interval may be for example 25 msec, and the timeout interval from last received packet corresponding to a VO AC packet may be 25 msec for an uplink 21, 50 msec for a downlink 25, and 50 msec for a bi-directional link. The maximum snooze interval corresponding to a VO AC may be for example one beacon period.

If the highest detected AC in a relevant period is in a background or best efforts AC, then, in such cases, and in some embodiments the power saving parameters 31 of a station 14 may be set for example according to a pre-defined value to balance battery life and performance of the station 14.

Other AC's, timeout intervals, snooze intervals and beacon periods may be used. The figures and AC's listed on FIG. 2 serve only as examples of parameters in an embodiment of the invention Reference is made to FIG. 3, a flow diagram depicting a method of coordinating a power saving parameter with an AC in accordance with an embodiment of the invention. In block 300, a station or for example a component within a station such as for example a processor, may evaluate one or more packets or portions of data in a link to or from a station during a relevant period, and may detect an AC The component may for example categorize the AC in a QoS hierarchy as being for example a highest AC during a relevant period.

In block 302, a component of a station, such as for example a processor, may coordinate or set a power saving parameter for such station with for example the power savings parameters that are applicable to for example the highest level AC that was detected by for example a processor in a link during a relevant period. For example a processor may set a power saving parameter of a station to satisfy the most stringent power savings parameters that are applicable to any of the AC's detected in a link such as an uplink or a downlink in a relevant period. In some embodiments a timeout interval of a station may be set to the maximum timeout interval that is associated with for example the highest AC detected in a link during the relevant period. Similarly, a snooze interval may be set to the snooze interval applicable to for example the highest AC detected in a link during the relevant period. Other methods of coordinating a power saving parameter for a station with an AC are possible.

Figure 4:
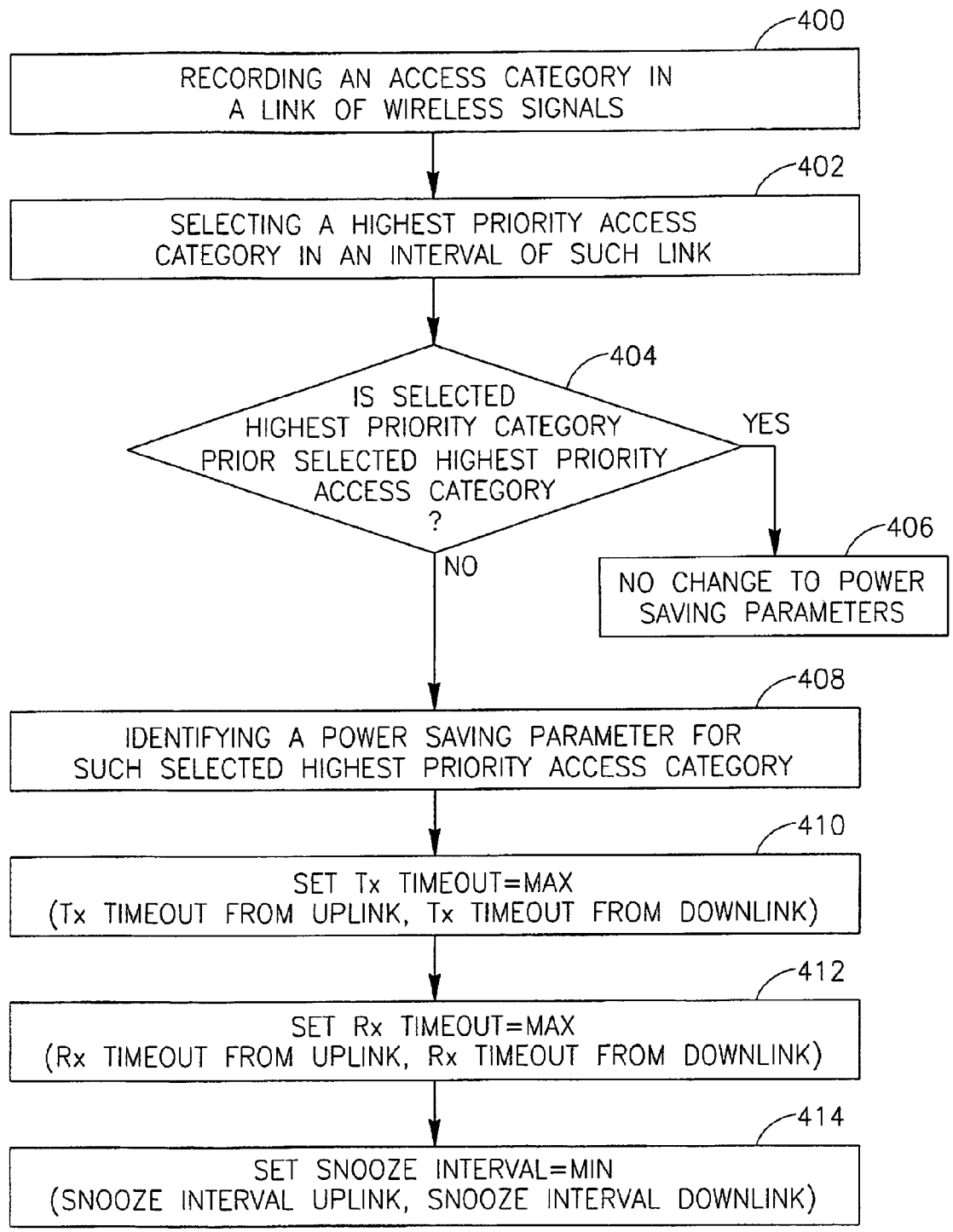
FIG. 4 is a flow diagram depicting a method of setting a power saving parameter of a station to match the highest AC detected in a link during a relevant period in accordance with an embodiment of the invention.

Reference is made to FIG. 4, a flow diagram depicting a method of setting a power saving parameter of a station to the parameters of the highest AC detected in a link in a relevant period in accordance with an embodiment of the invention. In block 400, a time synchronization function or other function may store, update or record one or more of the AC's that are present in one or more streams of packets or MSDUs in a link that are transmitted from or received by a station in for example an uplink or a downlink. In some embodiments a list of the AC's in such link during a relevant period may be created or stored.

In block 402, on for example, a periodic basis, such as once every N=1 second, or another suitable period, an evaluation may be made of for example the stored list of AC's in an uplink or a downlink, to determine and select for example the maximum or highest level AC that was present in the uplink or the downlink in the interval being evaluated. Other periodicities of such determination are possible and such periods may be expressed as every N seconds. In some embodiments, such an evaluation may be made when N is less than or equal to sec-s, where sec is the elapsed time since a fixed starting point, and s is the last time that such an evaluation was made.

In some embodiments, a process for selecting or determining the highest or maximum AC present in a relevant interval may be expressed as max AC=highest AC present for as long as (last determination time>current time−N msec) Other methods and expressions are possible.

In block 404, a determination may be made as to whether the maximum or highest AC selected or detected in an uplink or a downlink during the current relevant period is the same as or different from the highest AC detected or selected during the prior relevant period. If such highest AC in the current relevant period is the same as it was during the prior relevant period, the method may continue to block 406, where the current power saving parameters of a station may be retained and no change may be made to the power saving parameters of a station. If such highest detected AC present or detected in the current relevant period is not the same as the highest or maximum detected AC present in the prior relevant period, the method may continue to block 408.

In block 408, a component of for example a station, such as for example a processor of such station, may identify one or more power saving parameters that are associated with the selected highest priority AC. In some embodiments, the power saving parameters for one or more AC's may be stored for example in a memory of a station.

In some embodiments, a highest priority AC may be identified for both the uplinks and the downlinks.

In block 410, a Tx timeout interval for a station may be set to the maximum or longest Tx timeout interval corresponding to the highest priority AC in an uplink and the lightest priority AC in a downlink. In some embodiments the derivation for the setting of the Tx timeout interval may be expressed as follows: Tx timeout interval for a station=Max (Tx timeout from uplink, Tx timeout from downlink).

In block 412, an Rx timeout interval for a station may be set to the maximum or longest timeout interval for the selected highest priority AC in a downlink and the selected highest priority AC in an uplink. In some embodiments the derivation for the setting of the Rx power saving parameter may be expressed as follows: Rx timeout interval for a station=Max (Rx timeout from uplink, Rx timeout from downlink).

In block 414, a snooze interval for a station may be set to the minimum or shortest snooze interval from the highest priority AC in a downlink and the highest priority AC in an uplink. In some embodiments the derivation for the setting of the snooze interval may be expressed as follows: Snooze Interval=Min (snooze interval from uplink, snooze interval from downlink).

Other expressions and methods of selecting power saving parameters in coordination with an AC are possible.

It will be appreciated by persons skilled in the art that embodiments of the invention are not limited by what has been particularly shown and described hereinabove. Rather the scope of at least one embodiment of the invention is defined by the claims below.

We claim:

1. A method comprising:
   maintaining by a wireless communication station a plurality of sets of power saving parameter values associated with a plurality of predefined access categories, respectively, wherein each set of power saving parameter values includes one or more predefined power saving parameter values associated with a respective access category, wherein the one or more power saving parameter values include at least one of a predefined awake interval value and a predefined snooze interval value, wherein the awake interval value defines a length of time after a transmission that said station stays awake before said station enters a power save mode, and wherein the snooze interval value defines a length of time during which the station remains in the power save mode;
   determining at least one highest priority access category corresponding to transmission over a link of the station during an interval of time;
   selecting from the plurality of sets of power saving parameter values at least one set of power saving parameter values corresponding to the determined highest priority access category; and
   based on the selected set of power saving parameter values, setting at the station at least one of a length of time of an awake interval after a transmission over the link that said station stays awake before said station enters the power save mode and a length of time of a snooze interval during which the station remains in the power save mode.

2. The method as in claim 1 comprising recording access categories in said link of said station, wherein determining the highest access category includes selecting the highest access category from the recorded access categories during the interval of time.

3. The method as in claim 1, wherein each set of power saving parameter values associated with a respective access category includes at least one awake interval value and a snooze interval value corresponding to the access category, and wherein setting at least one of the length of time of the awake interval and the length of time of the snooze interval includes setting the length of time of the awake interval based on the at least one awake interval value and setting the snooze interval based on the snooze interval value.

4. The method as in claim 1, wherein determining the at least one highest priority access category comprises determining an uplink highest priority access category of an uplink of said station and a downlink highest priority access category of a downlink of said station.

5. The method as in claim 4, wherein the at least one awake interval value includes one or more of a first value, corresponding to the uplink, defining a first length of time after transmitting an uplink transmission that said station stays awake before entering the power save mode; a second value, corresponding to the uplink, defining a second length of time after receiving a downlink transmission that said station stays awake before entering the power save mode; a third value, corresponding to the downlink, defining a third length of time after transmitting the uplink transmission that the station stays awake before entering the power save mode; and a fourth value, corresponding to the downlink, defining a fourth length of time after receiving the downlink transmission that the station stays awake before entering the power save mode.

6. The method as in claim 5, wherein setting the length of time of the awake interval includes setting the length of time after transmitting the uplink transmission that the station stays awake before entering the power save mode according to the longest of the first and third lengths of time.

7. The method as in claim 5, wherein setting the length of time of the awake interval includes setting the length of time after receiving the downlink transmission that the station stays awake before entering the power save mode according to the longest of the second and fourth lengths of time.

8. The method as in claim 4, wherein setting the length of time of the snooze interval includes setting the length of time during which the station remains in the power save mode as the shortest of a length of a first snooze interval value corresponding to the uplink highest priority access category and a second snooze interval value corresponding to the downlink highest priority access category.

9. A device comprising:
a memory to maintain a plurality of sets of power saving parameter values associated with a plurality of predefined access categories, respectively, wherein each set of power saving parameter values includes one or more predefined power saving parameter values associated with a respective access category, wherein the one or more power saving parameter values include at least one of a predefined awake interval value and a predefined snooze interval value, wherein the awake interval value defines a length of time after a transmission that a wireless communication station stays awake before said station enters a power save mode, and wherein the snooze interval value defines a length of time during which the station remains in the power save mode; and
a processor to:
determine at least one highest priority access category corresponding to transmission over a link of the station during an interval of time;
select from the plurality of sets of power saving parameter values at least one set of power saving parameter values corresponding to the determined highest priority access category; and
based on the selected set of power saving parameter values, to set at the station at least one of a length of time of an awake interval after a transmission over the link that said station stays awake before said station enters the power save mode and a length of time of a snooze interval during which the station remains in the power save mode.

10. The device as in claim 9, wherein the processor is to select the highest access category from access categories recorded during the interval of time.

11. The device as in claim 9, wherein said processor is to determine an uplink highest priority access category of an uplink of said station and a downlink highest priority access category of a downlink of said station, and to determine at least one of the length of time of the awake interval and the length of time of the snooze interval based on the power saving parameter values corresponding to the uplink access category and the power saving parameter values corresponding to the downlink access category.

12. The device as in claim 11, wherein each set of power saving parameter values associated with a respective access category includes at least one awake interval value and a snooze interval value corresponding to the access category,
wherein the at least one awake interval value includes one or more of a first value, corresponding to the uplink, defining a first length of time after transmitting an uplink transmission that said station stays awake before entering the power save mode; a second value, corresponding to the uplink, defining a second length of time after receiving a downlink transmission that said station stays awake before entering the power save mode; a third value, corresponding to the downlink, defining a third length of time after transmitting the uplink transmission that the station stays awake before entering the power save mode; and a fourth value, corresponding to the downlink, defining a fourth length of time after receiving the downlink transmission that the station stays awake before entering the power save mode,
wherein said processor is to coordinate the length of time of the awake interval after transmitting the uplink transmission that the station stays awake before entering the power save mode according to the longest of the first and third lengths of time,
wherein said processor is to coordinate the length of time of the awake interval after receiving the downlink transmission that the station stays awake before entering the power save mode according to the longest of the second and fourth lengths of time,
and wherein said processor is to coordinate the length of time during which the station remains in the power save mode as the shortest of a length of a first snooze interval value corresponding to the uplink highest priority access category and a second snooze interval value corresponding to the downlink highest priority access category.

13. A system comprising:
a wireless communication station including:
a dipole antenna;
a memory to maintain a plurality of sets of power saving parameter values associated with a plurality of predefined access categories, respectively, wherein each set of power saving parameter values includes one or more predefined power saving parameter values associated with a respective access category, wherein the one or more power saving parameter values include at least one of a predefined awake interval value and a predefined snooze interval value, wherein the awake interval value defines a length of time after a transmission that the station stays awake before said station enters a power save mode, and wherein the snooze interval value defines a length of time during which the station remains in the power save mode; and
a processor to:
determine at least one highest priority access category corresponding to transmission over a link of the station during an interval of time;

select from the plurality of sets of power saving parameter values at least one set of power saving parameter values corresponding to the determined highest priority access category; and based on the selected set of power saving parameter values, to set at the station at least one of a length of time of an awake interval after a transmission over the link that said station stays awake before said station enters the power save mode and a length of time of a snooze interval during which the station remains in the power save mode.

14. A system as in claim 13, wherein the processor is to select the highest access category from access categories recorded during the interval of time.

15. A system as in claim 13, wherein said processor is to determine an uplink highest priority access category of an uplink of said station and a downlink highest priority access category of a downlink of said station, and to determine at least one of the length of time of the awake interval and the length of time of the snooze interval based on the power saving parameter values corresponding to the uplink access category and the power saving parameter values corresponding to the downlink access category.

16. A system as in claim 15, wherein each set of power saving parameter values associated with a respective access category includes at least one awake interval value and a snooze interval value corresponding to the access category, wherein the at least one awake interval value includes one or more of a first value, corresponding to the uplink, defining a first length of time after transmitting an uplink transmission that said station stays awake before entering the power save mode; a second value, corresponding to the uplink, defining a second length of time after receiving a downlink transmission that said station stays awake before entering the power save mode; a third value, corresponding to the downlink, defining a third length of time after transmitting the uplink transmission that the station stays awake before entering the power save mode; and a fourth value, corresponding to the downlink, defining a fourth length of time after receiving the downlink transmission that the station stays awake before entering the power save mode, wherein said processor is to coordinate the length of time of the awake interval after transmitting the uplink transmission that the station stays awake before entering the power save mode according to the longest of the first and third lengths of time, wherein said processor is to coordinate the length of time of the awake interval after receiving the downlink transmission that the station stays awake before entering the power save mode according to the longest of the second and fourth lengths of time, and wherein said processor is to coordinate the length of time during which the station remains in the power save mode as the shortest of a length of a first snooze interval value corresponding to the uplink highest priority access category and a second snooze interval value corresponding to the downlink highest priority access category.

17. An article comprising a storage medium, having stored thereon instructions, that when executed, result in:

determining at least one highest priority access category corresponding to transmission over a link of a station during an interval of time;

selecting from a plurality of sets of power saving parameter values maintained by the station at least one set of power saving parameter values corresponding to the determined highest priority access category, wherein the plurality of sets of power saving parameter values are associated with a plurality of predefined access categories, respectively, wherein each set of power saving parameter values includes one or more predefined power saving parameter values associated with a respective access category, wherein the one or more power saving parameter values include at least one of a predefined awake interval value and a predefined snooze interval value, wherein the awake interval value defines a length of time after a transmission that said station stays awake before said station enters a power save mode, and wherein the snooze interval value defines a length of time during which the station remains in the power save mode; and based on the selected set of power saving parameter values, setting at the station at least one of a length of time of an awake interval after a transmission over the link that said station stays awake before said station enters the power save mode and a length of time of a snooze interval during which the station remains in the power save mode.

18. The article as in claim 17, wherein said instructions further result In determining an uplink highest priority access category of an uplink of said station and a downlink highest priority access category of a downlink of said station; and determining at least one of the length of time of the awake interval and the length of time of the snooze interval based on the power saving parameter values corresponding to the uplink access category and the power saving parameter values corresponding to the downlink access category.

19. The article as in claim 18, wherein each set of power saving parameter values associated with a respective access category includes at least one awake interval value and a snooze interval value corresponding to the access category, wherein the at least one awake interval value includes one or more of a first value, corresponding to the uplink, defining a first length of time after transmitting an uplink transmission that said station stays awake before entering the power save mode, a second value, corresponding to the uplink, defining a second length of time after receiving a downlink transmission that said station stays awake before entering the power save mode; a third value, corresponding to the downlink, defining a third length of time after transmitting the uplink transmission that the station stays awake before entering the power save mode; and a fourth value, corresponding to the downlink, defining a fourth length of time after receiving the downlink transmission that the station stays awake before entering the power save mode, and wherein said instructions further result in coordinating the length of time of the awake interval after transmitting the uplink transmission that the station stays awake before entering the power save mode according to the longest of the first and third lengths of time, coordinating the length of time of the awake interval after receiving the downlink transmission that the station stays awake before entering the power save mode according to the longest of the second and fourth lengths of time, and coordinating the length of time during which the station remains in the power save mode as the shortest of a length of a first snooze interval value corresponding to the uplink highest priority access category and a second snooze interval value corresponding to the downlink highest priority access category.

* * * * *

UNITED STATES PATENT AND TRADEMARK OFFICE
CERTIFICATE OF CORRECTION

PATENT NO. : 7,577,113 B2  Page 1 of 1
APPLICATION NO. : 11/094289
DATED : August 18, 2009
INVENTOR(S) : Alon et al.

It is certified that error appears in the above-identified patent and that said Letters Patent is hereby corrected as shown below:

In column 9, line 12, in Claim 14, delete "A" and insert -- The --, therefor.

In column 9, line 15, in Claim 15, delete "A" and insert -- The --, therefor.

In column 9, line 24, in Claim 16, delete "A" and insert -- The --, therefor.

In column 10, line 23, in Claim 18, delete "In" and insert -- in --, therefor.

In column 10, line 39, in Claim 19, delete "mode," and insert -- mode; --, therefor.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,577,113 B2
APPLICATION NO. : 11/094289
DATED : August 18, 2009
INVENTOR(S) : Alon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Seventh Day of September, 2010

David J. Kappos
*Director of the United States Patent and Trademark Office*